US012719264B2

(12) United States Patent
Kurotsu

(10) Patent No.: US 12,719,264 B2
(45) Date of Patent: Aug. 25, 2026

(54) ESD PROTECTION CIRCUIT

(71) Applicant: LAPIS Technology Co., Ltd., Yokohama (JP)

(72) Inventor: Satoru Kurotsu, Yokohama (JP)

(73) Assignee: LAPIS Technology Co., Ltd., Yokohama (JP)

(*) Notice: Subject to any disclaimer, the term of this patent is extended or adjusted under 35 U.S.C. 154(b) by 183 days.

(21) Appl. No.: 18/803,607

(22) Filed: Aug. 13, 2024

(65) Prior Publication Data

US 2025/0070550 A1 Feb. 27, 2025

(30) Foreign Application Priority Data

Aug. 22, 2023 (JP) ................................ 2023-135000

(51) Int. Cl.
*H02H 9/02* (2006.01)
*H02H 9/00* (2006.01)

(52) U.S. Cl.
CPC ............ *H02H 9/025* (2013.01); *H02H 9/005* (2013.01)

(58) Field of Classification Search
CPC ........ H02H 9/025; H02H 9/005; H02H 9/046; H02H 9/04; H02H 7/20
See application file for complete search history.

(56) References Cited

U.S. PATENT DOCUMENTS 8,238,067 B2 * 8/2012 Drapkin ................ H02H 9/046 361/111
8,514,532 B2 * 8/2013 Worley ................. H02H 9/046 361/111
8,643,987 B2 * 2/2014 Chu ....................... H02H 9/046 361/111
9,882,376 B2 * 1/2018 Fifield .................... H02H 9/046
11,201,467 B2 * 12/2021 Franck .................. H02H 9/048
2010/0232078 A1 * 9/2010 Bhattacharya ....... H10D 89/811 361/56
2012/0307406 A1 * 12/2012 Tatsumi ................ H10D 84/85 361/56
2014/0168831 A1 * 6/2014 Watanabe ............. H02H 9/046 361/56
2021/0343702 A1 * 11/2021 Xu ........................ H02H 3/046
2024/0136813 A1 * 4/2024 Kim ...................... H02H 9/046

FOREIGN PATENT DOCUMENTS

JP 2012253241 12/2012

* cited by examiner

*Primary Examiner* — Daniel Cavallari
(74) *Attorney, Agent, or Firm* — JCIPRNET

(57) ABSTRACT

An RC circuit 110 is connected in series between VDD and GND. A RC circuit 120 is set with a time constant different from that of the RC circuit 110 connected in series between VDD and GND. In the inverter circuit 210, a potential is input between a resistance element 111 and a capacitance element 112. In the inverter circuit 220, a potential is input between a resistance element 121 and a capacitance element 122. In an NMOS transistor 310, an output of the inverter circuit 210 is input to a gate terminal, and a drain terminal is connected to VDD. In an NMOS transistor 320, an output of the inverter circuit 220 is input to a gate terminal, a drain terminal is connected with a source terminal of the NMOS transistor 310, and a source terminal is connected with GND.

12 Claims, 5 Drawing Sheets

ESD PROTECTION CIRCUIT

CROSS-REFERENCE TO RELATED APPLICATION

This application claims priority under 35 USC 119 from Japanese Patent application No. 2023-135000 filed on Aug. 22, 2023, the disclosure of which is incorporated by reference herein.

BACKGROUND

Technical Field

The disclosure relates to an ESD protection circuit.

Description of Related Art

In a semiconductor integrated circuit, an electrostatic discharge (ESD) protection circuit for protecting an internal circuit from being damaged due to ESD noise is provided. As the ESD protection circuit, an RC trigger between-power clamping type ESD protection circuit is used commonly (see, for example, Japanese Laid-open No. 2012-253241).

With such ESD protection circuit, a circuit configuration is formed, so that, when ESD noise (ESD surge noise) occurs, by setting a clamp MOS transistor that clamps a power source and the ground to be ON only during a period determined by a time constant of an RC serial circuit, a connected state is set between the power source and the ground from ESD noise, and the internal circuit is protected from the ESD noise.

Here, when the time constant of the RC serial circuit becomes too large, the ESD protection circuit may operate even during normal operation. Therefore, in the ESD protection circuit, the time constant of the RC serial circuit is set to be a value small to a certain extent, so that the MOS transistor is not turned to ON when power is turned on normally. In addition, the greater the time constant of the RC serial circuit, the longer the time during which the clamp MOS transistor becomes ON. Therefore, when the time constant of the RC serial circuit becomes too large, the time during which the clamp MOS transistor may become too long, the clamp current flowing between the power source and the clamp may become too large, and the circuit element may be damaged, etc.

However, when the time constant of the RC serial circuit is too small, in the case where a power voltage fluctuates due to the occurrence of noise, etc., in a power source during normal operation, the ESD protection circuit operates, the power source and the ground are connected, and an unnecessary large current may occur.

The disclosure provides an ESD protection circuit that does not operate when the power source is turned on normally, and does not operate even in the case where the power voltage fluctuates during normal operation.

SUMMARY

An ESD protection circuit according to the disclosure includes: a first RC circuit, connected in series between a power wiring and a ground wiring; a first inverter circuit, to which a potential between a resistance element and a capacitance element forming the first RC circuit is input, and which is connected between the power wiring and the ground wiring; a second RC circuit, which is connected in series between the power wiring and the ground wiring, and in which a time constant different from that of the first RC circuit is set; a second inverter circuit, to which a potential between a resistance element and a capacitance element forming the second RC circuit is input, and which is connected between the power wiring and the ground wiring; a first NMOS transistor, in which an output of the first inverter circuit is input to a gate terminal, and a drain terminal is connected with the power wiring; and a second NMOS transistor, in which an output of the second inverter circuit is input to a gate terminal, a drain terminal is connected with a source terminal of the first NMOS transistor, and a source terminal is connected with the ground wiring.

Another ESD protection circuit according to the disclosure includes: a first CR circuit, connected in series between a power wiring and a ground wiring; a first inverter circuit, to which a potential between a capacitance element and a resistance element forming the first CR circuit is input, and which is connected between the power wiring and the ground wiring; a second CR circuit, which is connected in series between the power wiring and the ground wiring, and in which a time constant different from that of the first CR circuit is set; a second inverter circuit, to which a potential between a capacitance element and a resistance element forming the second CR circuit is input, and which is connected between the power wiring and the ground wiring; a first PMOS transistor, in which an output of the first inverter circuit is input to a gate terminal, and a source terminal is connected with the power wiring; and a second PMOS transistor, in which an output of the second inverter circuit is input to a gate terminal, a source terminal is connected with a drain terminal of the first PMOS transistor, and a drain terminal is connected with the ground wiring.

DESCRIPTION OF THE EMBODIMENTS

Figure 1:
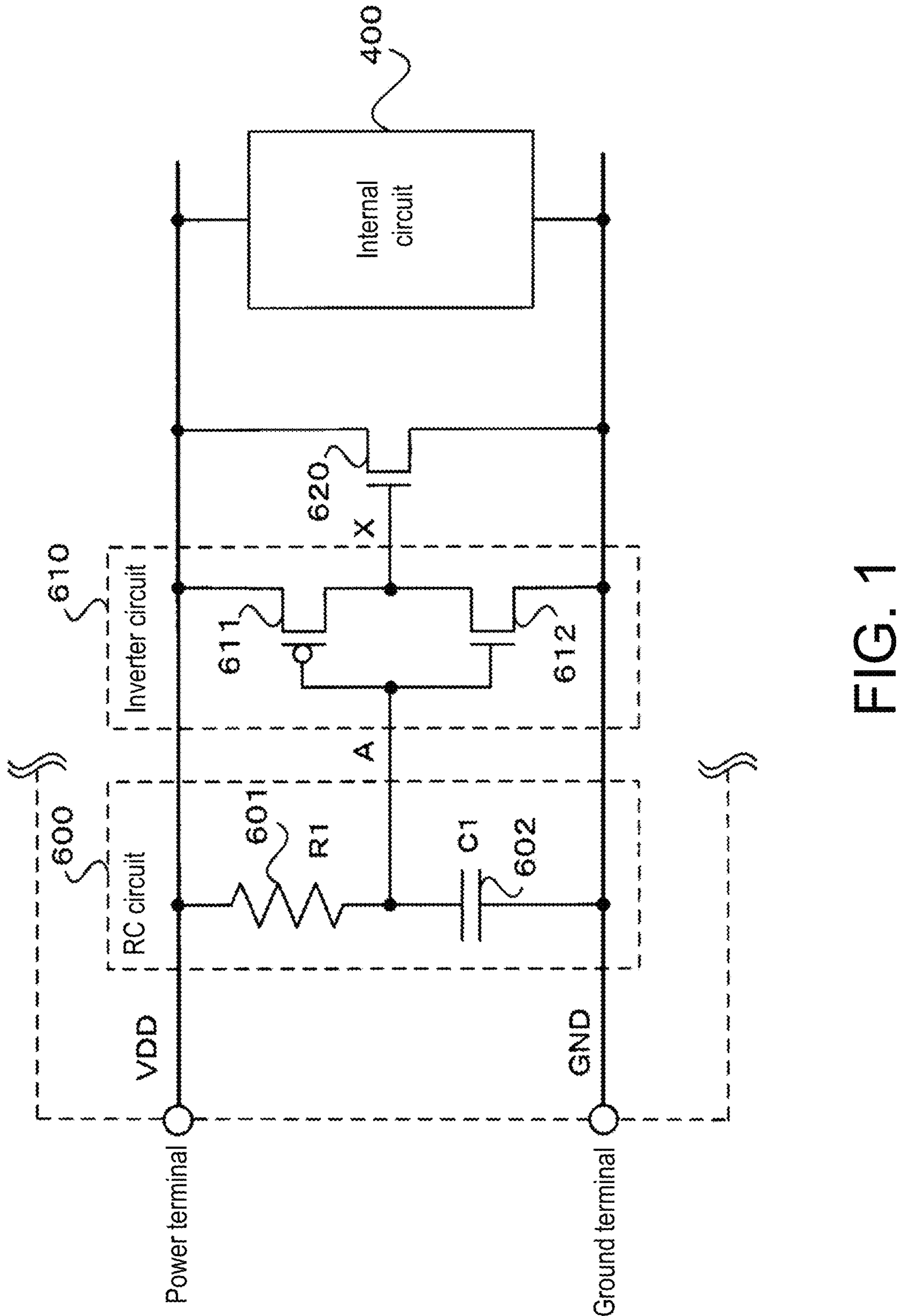
FIG. 1 is a diagram illustrating a circuit configuration of an ESD protection circuit as a comparative example.

An ESD protection circuit according to the disclosure includes: a first RC circuit, connected in series between a power wiring and a ground wiring; a first inverter circuit, to which a potential between a resistance element and a capacitance element forming the first RC circuit is input, and which is connected between the power wiring and the ground wiring; a second RC circuit, which is connected in series between the power wiring and the ground wiring, and in which a time constant different from that of the first RC circuit is set; a second inverter circuit, to which a potential between a resistance element and a capacitance element forming the second RC circuit is input, and which is connected between the power wiring and the ground wiring; a first NMOS transistor, in which an output of the first inverter circuit is input to a gate terminal, and a drain terminal is connected with the power wiring; and a second NMOS transistor, in which an output of the second inverter circuit is input to a gate terminal, a drain terminal is connected with a source terminal of the first NMOS transistor, and a source terminal is connected with the ground wiring.

In addition, in the ESD protection circuit according to the disclosure, it may also be that the second RC circuit is set with a time constant greater than that of the first RC circuit and having a magnitude so that no response occurs due to noise mixed into the power wiring.

In addition, in the ESD protection circuit according to the disclosure, it may also be that the drain terminal of the first NMOS transistor and the drain terminal of the second NMOS transistor are both formed by removing a silicide film.

Another ESD protection circuit according to the disclosure includes: a first CR circuit, connected in series between a power wiring and a ground wiring; a first inverter circuit, to which a potential between a capacitance element and a resistance element forming the first CR circuit is input, and which is connected between the power wiring and the ground wiring; a second CR circuit, which is connected in series between the power wiring and the ground wiring, and in which a time constant different from that of the first CR circuit is set; a second inverter circuit, to which a potential between a capacitance element and a resistance element forming the second CR circuit is input, and which is connected between the power wiring and the ground wiring; a first PMOS transistor, in which an output of the first inverter circuit is input to a gate terminal, and a source terminal is connected with the power wiring; and a second PMOS transistor, in which an output of the second inverter circuit is input to a gate terminal, a source terminal is connected with a drain terminal of the first PMOS transistor, and a drain terminal is connected with the ground wiring.

In addition, in the ESD protection circuit according to the disclosure, it may also be that the second CR circuit is set with a time constant greater than that of the first CR circuit and having a magnitude so that no response occurs due to noise mixed into the ground wiring.

In addition, in the ESD protection circuit according to the disclosure, it may also be that the source terminal of the first PMOS transistor and the source terminal of the second PMOS transistor are both formed by removing a silicide film.

According to the disclosure, an ESD protection circuit that does not operate when the power source is turned on normally, and does not operate even in the case where the power voltage fluctuates during normal operation.

Solutions to the Issues

In the following, the embodiments of the disclosure are described in detail with reference to the drawings.

Firstly, before describing the ESD protection circuit according to the embodiment, a circuit configuration of an ESD protection circuit as the conventional RC trigger between-power clamping type ESD protection circuit is described as a comparative example.

FIG. 1 is a diagram illustrating a circuit configuration of an ESD protection circuit as a comparative example.

As shown in FIG. 1, the ESD protection circuit as a comparative example is formed by a RC circuit 600, an inverter circuit 610, and an NMOS transistor 620. The RC circuit 600 is connected in series between a power wiring (VDD) and a ground wiring (GND). A potential between a resistance element 601 and a capacitance element 602 forming the RC circuit 600 is input to the inverter circuit 610, and the inverter circuit 610 is connected between VDD and GND.

The ESD protection circuit serves to protect an internal circuit 400 from ESD noise applied to the power terminal.

In the RC circuit 600, the resistance element 601 and the capacitance element 602 are connected in series between VDD and GND. The output of the inverter circuit 610 is input to the gate terminal of the NMOS transistor 620, and the drain terminal and the source terminal are respectively connected with VDD and GND.

The inverter circuit 610 forms a complementary metal oxide semiconductor (CMOS) type inverter circuit connecting a PMOS transistor 611 and an NMOS transistor 612 are connected in series between VDD and GND.

Figure 2:
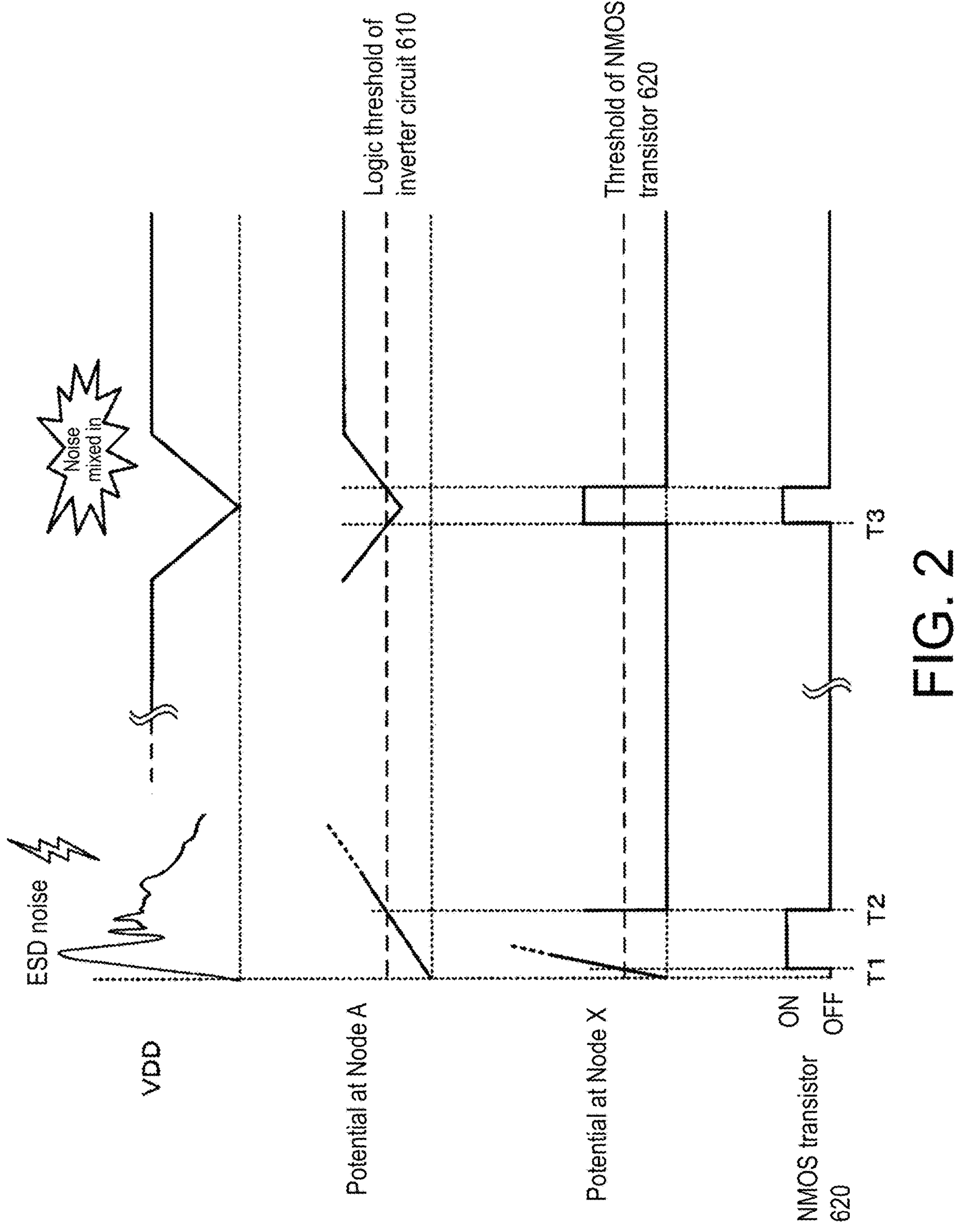
FIG. 2 is a diagram illustrating an operational waveform for the ESD protection circuit of a comparative example shown in FIG. 1.

Then, FIG. 2 illustrates an operational waveform for the ESD protection circuit of the comparative example shown in FIG. 1.

In the case where ESD noise is applied to VDD from the outside, the potential at a node A, which is an input of the inverter circuit 610 in the initial state, is 0V. Therefore, when the potential of VDD becomes equal to or greater than the threshold of the PMOS transistor 611, the PMOS transistor 611 becomes ON, and the potential of VDD is applied to the gate terminal of the NMOS transistor 620. Therefore, the NMOS transistor 620 becomes ON, electrically connects VDD and GND, and clamps the ESD noise, thereby preventing the ESD noise from being directly applied to the internal circuit 400. Accordingly, the internal circuit 400 is protected from ESD noise by using the ESD protection circuit.

That is, in the case where ESD noise is applied to VDD from the outside, in the operational waveform shown in FIG. 2, at a time T1 when the potential at a node X exceeds the NMOS transistor 620, the NMOS transistor 620 becomes ON, and clamping is performed so that the voltage between VDD and GND does not exceed the withstand voltage of the internal circuit 400.

Here, the rising of the potential at the node A, which is the input of the inverter circuit 610, is delayed from VDD by a time constant R1×C1 resulting from a resistance value R1 of the resistance element 601 and a capacitance value C1 of the capacitance value 602 in the RC circuit 600. Therefore, when the potential at the node A rises through time and becomes equal to or more than the logic threshold of the inverter circuit 610, the NMOS transistor 612 becomes ON, and the PMOS transistor 611 becomes OFF. As a result, the potential at the node X becomes L-level (low level), and the NMOS transistor 620 becomes OFF.

Specifically, in the operational waveform shown in FIG. 2, at a time T2 when the potential at the node A becomes equal to or more than the logic threshold of the inverter circuit 610, the NMOS transistor 620 becomes OFF.

In the case where VDD is turned on normally, VDD does not rise as steeply. Therefore, the potential at the node A rises substantially without delay with respect to VDD, and the NMOS transistor 620 transistors to the normal operation state without becoming ON.

However, in the ESD protection circuit so configured, in the normal operation state in which VDD is a constant voltage, in the case where some kind of noise is mixed with VDD, the NMOS transistor 620 may be turned on momentarily. Specifically, in the case where the noise waveform mixed with VDD is greater than the time constant R1×C1 determined by the resistance value R1 of the resistance element 601 and the capacitance value C1 of the capacitance element 602, the RC circuit 600 responds. As a result, as shown in FIG. 2, at a time T3, the potential at the node A drops below the logic threshold of the inverter circuit 610, and the potential at the node X, which is the output of the inverter circuit 610, becomes H-level (high level). Therefore, the NMOS transistor 620 becomes ON, an unnecessary large current flows between the power source (VDD) and the ground (GND), and issues such as that the power consumption of the semiconductor integrated circuit increases, or a circuit element is damaged by the flow of the large current, etc., may arise.

Such issue in the normal operation state is solved by increasing the time constant R1×C1 in the RC circuit 600. However, when the time constant R1×C1 of the RC circuit 600 is set to be excessively large, issues such as that the ESD protection circuit operates even at the time of normal operation, or that the time during which the NMOS transistor 620 becomes ON when ESD noise occurs becomes excessively long, making the clamp current flowing between the power source and the ground excessively large, thus damaging a circuit element, etc., may arise Therefore, in the first embodiment of the disclosure, with a circuit configuration as described below, an ESD protection circuit that does not operate when the power source is turned on normally and does not operate even in the case where the power voltage fluctuates during normal operation is realized.

First Embodiment

Figure 3:
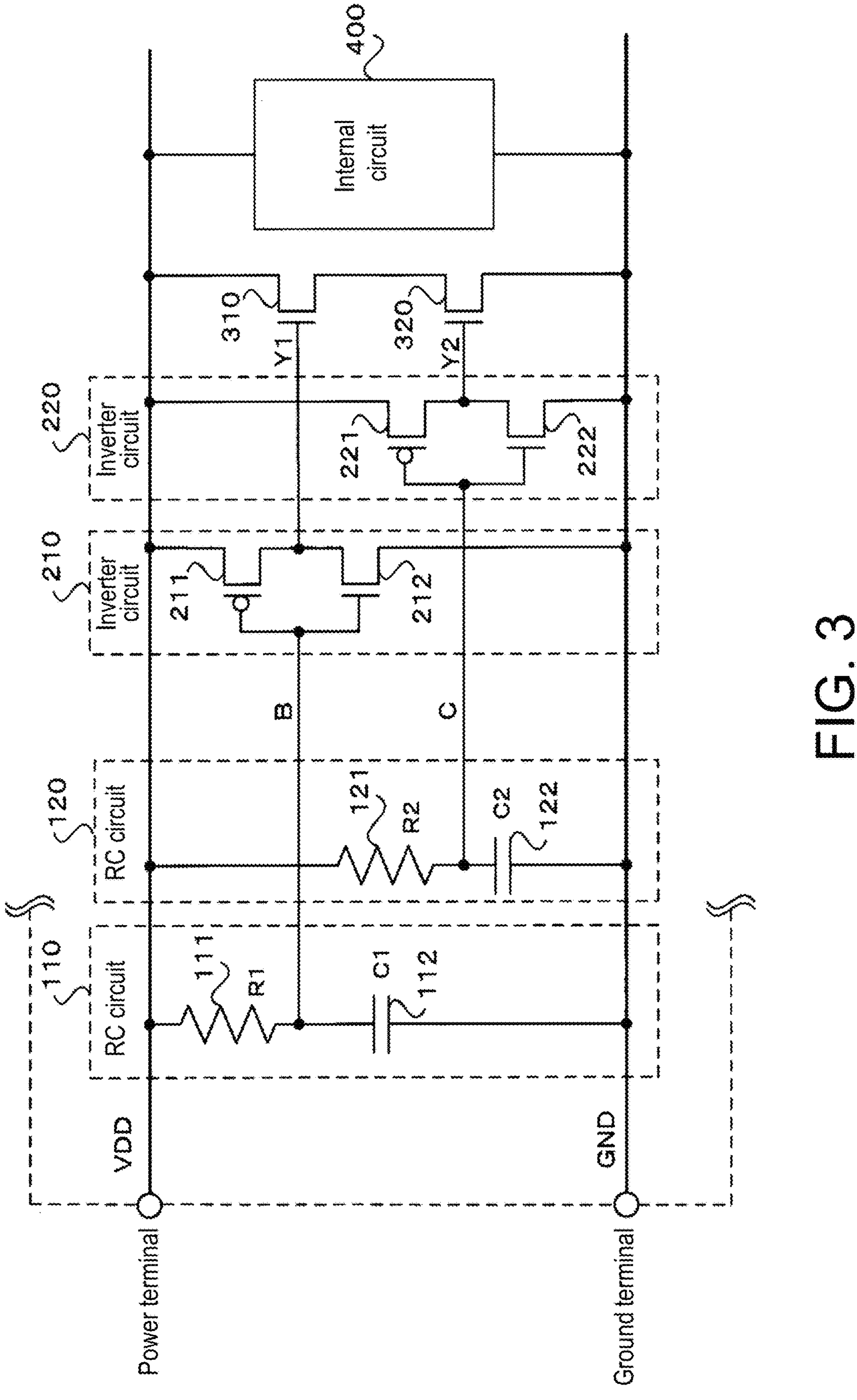
FIG. 3 is a diagram illustrating a circuit configuration of an ESD protection circuit according to a first embodiment of the disclosure.

Then, the ESD protection circuit of the first embodiment of the disclosure is described. FIG. 3 illustrates a circuit configuration of the ESD protection circuit according to the first embodiment of the disclosure.

As shown in FIG. 3, the ESD protection circuit of the embodiment includes RC circuits 110, 120, inverter circuits 210, 220, and two NMOS transistors 310, 320.

The RC circuit 110 is provided with a resistance element 111 and a capacitance element 112 connected in series between VDD, which is a power wiring, and GND, which is a ground wiring.

The RC circuit 120 is provided with a resistance element 121 and a capacitance element 122 connected in series between VDD and GND. A time constant R2×C2 in the RC circuit 120 is set to be a value different from the time constant R1×C1 in the RC circuit 110. In the embodiment, the time constant R2×C2 in the RC circuit 120 is set to be a time constant larger than the time constant R1×C1 and a time constant in a magnitude that does not respond due to the noise mixed with VDD. The time constant R1×C1 in the RC circuit 110 is set to be the same value as the time constant of the RC circuit 600 in the ESD protection circuit of the comparative example shown in FIG. 1.

The inverter circuit 210 forms a CMOS type inverter circuit in which a potential between the resistance element 111 and the capacitance element 112 forming the RC circuit 110 is input, and a PMOS transistor 211 and an NMOS transistor 212 are connected in series between VDD and GND.

In addition, the inverter circuit 220 forms a CMOS type inverter circuit in which a potential between the resistance element 121 and the capacitance element 122 forming the RC circuit 120 is input, and a PMOS transistor 221 and an NMOS transistor 222 are connected in series between VDD and GND.

The NMOS transistors 310, 320 are connected in series between VDD and GND. Specifically, in the NMOS transistor 310, the output of the inverter circuit 210 is input to the gate terminal, and the drain terminal is connected to VDD. In addition, in the NMOS transistor 320, the output of the inverter circuit 220 is input to the gate terminal, the drain terminal is connected with the source terminal of the NMOS transistor 310, and the source terminal is connected to GND.

In the ESD protection circuit of the embodiment, with the two NMOS transistors 310, 320 being connected in series between VDD and GND, it is configured that VDD and GND are connected only in the case where the two NMOS transistors 310, 320 become ON at the same time.

Figure 4:
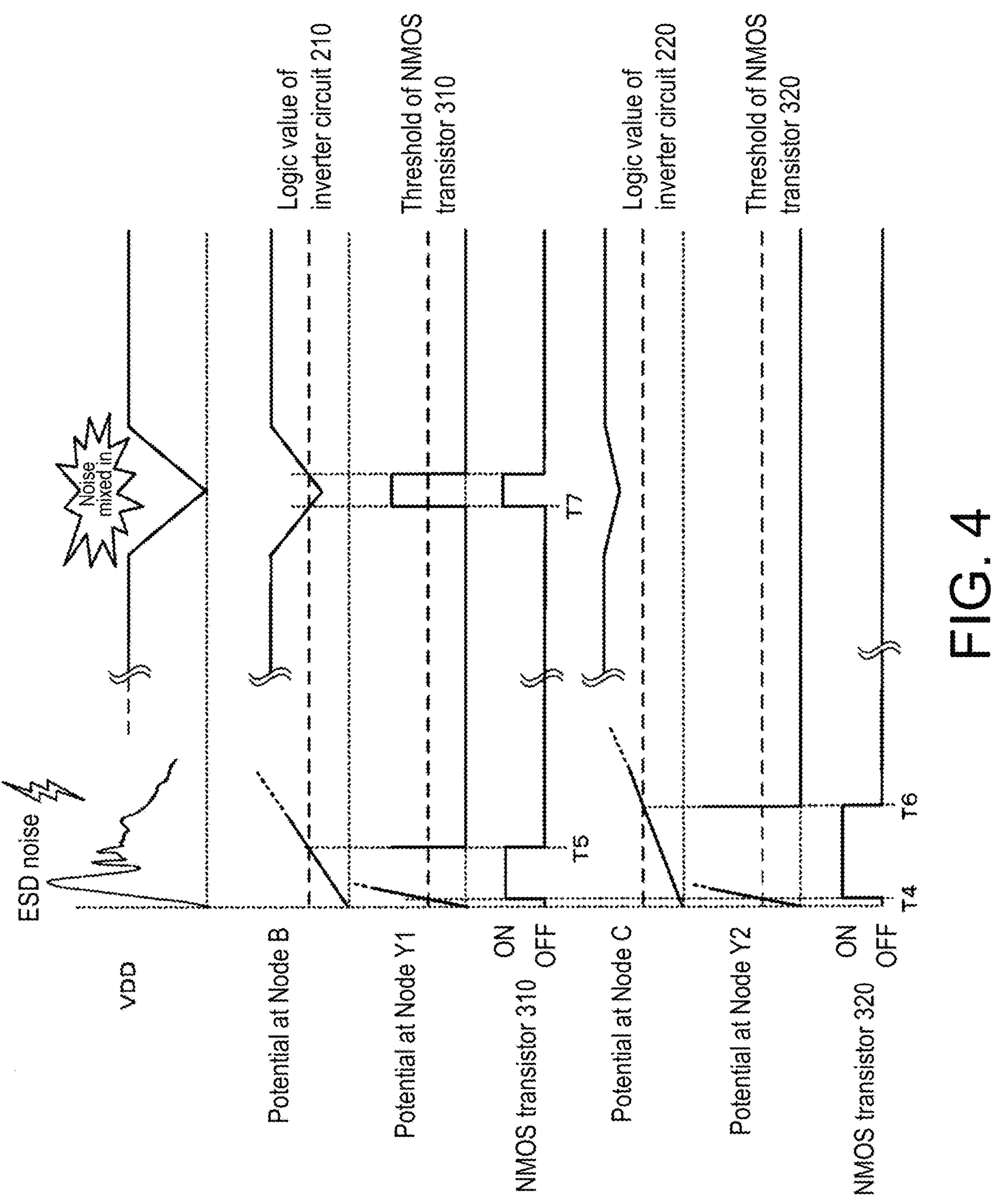
FIG. 4 is a diagram illustrating an operational waveform for the ESD protection circuit of the first embodiment shown in FIG. 3.

Then, FIG. 4 illustrates an operational waveform for the ESD protection circuit in the embodiment shown in FIG. 3.

In the case where a voltage that rises steeply, such as ESD noise, is applied to VDD from the outside, the voltages at the node B and the node C both rise gently with respect to the rising of VDD due to the presence of the RC circuits 110, 120. In addition, since the time constant R2×C2 of the RC circuit 120 is greater than the time constant R1×C1 of the RC circuit 110, the potential at the node C rises gently with respect to the potential at the node B.

In addition, until the potential at the node B becomes equal to or higher than the logic threshold of the inverter circuit 210, the potential of a node Y1 that is the output of the inverter circuit 210 keeps rising together with the rising of the potential of VDD. Moreover, until the potential at the node C becomes equal to or higher than the logic threshold of the inverter circuit 220, the potential of a node Y2 that is the output of the inverter circuit 210 keeps rising together with the rising of the potential of VDD.

Therefore, at a time T4 when the potential at the node Y1 becomes equal to or higher than the threshold of the NMOS transistor 310 and the potential at the node Y2 becomes equal to or more than the threshold of the NMOS transistor 320, the two NMOS transistors 310, 320 become ON together.

As a result, the ESD protection circuit in the embodiment operates, so that VDD and GND become connected, and the potential difference between VDD and GND decreases due to the flow of the current with respect to GND from VDD, and ESD noise is not directly applied to the internal circuit 400 by clamping the ESD noise. Accordingly, the internal circuit 400 is protected from ESD noise by using the ESD protection circuit.

When the potential at the node B rises through time and becomes equal to or more than the logic threshold of the inverter circuit 210 at a time T5, the NMOS transistor 212 becomes ON, and the PMOS transistor 211 becomes OFF. As a result, the potential at the node Y1 becomes L-level, and the NMOS transistor 310 becomes OFF.

In addition, when the potential at the node C rises through time and becomes equal to or more than the logic threshold of the inverter circuit 220, the NMOS transistor 222 becomes ON, and the PMOS transistor 221 becomes OFF. As a result, the potential at the node Y2 becomes L-level, and the NMOS transistor 320 becomes OFF.

In addition, clamping is performed between VDD and GND only during the period from the time T4 to the time T5 during which the NMOS transistors 310 and 320 both become ON.

Here, if the time constant R1×C1 of the RC circuit 600 in the ESD protection circuit of the comparative example shown in FIG. 1 and the time constant R1×C1 of the RC circuit 110 in the ESD protection circuit of the embodiment are of the same value, the period from the time T1 to the time T2 in FIG. 2 and the period from the time T4 to the time T5 in FIG. 4 are of the same length. That is, it is known that, with the ESD protection circuit of the embodiment, the protection function against ESD noise same as that of the ESD protection circuit of the comparative example shown in FIG. 1 is realized.

In the following, the operation in the case where noise is mixed into VDD in the normal operation state in which a normal voltage is applied to VDD is described.

As shown in FIG. 4, in the case where noise is mixed into VDD in the normal operation state, if the waveform with mixing of noise is greater than the time constant R1×C1 determined by the resistance value R1 of the resistance element 111 and the capacitance value C1 of the capacitance element 112, the RC circuit 110 responds. As a result, at a time T7, the potential at the node B drops below the logic threshold of the inverter circuit 210, and the potential at the node Y1, which is the output of the inverter circuit 210, rises from a GND level and becomes H-level. As a result, the NMOS transistor 310 becomes ON.

However, since the time constant R2×C2 of the RC circuit 120 is set to be a value greater than the time constant R1×C1 of the RC circuit 110, even in the case where noise of the same magnitude is mixed into VDD, the RC circuit 102 hardly responds to the voltage fluctuation of VDD. Therefore, as shown in the operational waveform of FIG. 4, even in the case where the potential at the node B drops below the logic threshold of the inverter circuit 210 at the time T7, the potential at the node C does not drop below the logic threshold of the inverter circuit 220. Therefore, the potential at the node Y2 is maintained at L-level, and the NMOS transistor 320 remains OFF.

With the above operation, even though the NMOS transistor 310 becomes ON when noise is mixed into VDD, the NMOS transistor 320 remains to be OFF. In the ESD protection circuit of the embodiment, a circuit configuration as follows is formed: when neither of the two NMOS transistors 310, 320 become OFF, VDD and GND are not connected. Therefore, if noise with which the RC circuit 120 does not respond is mixed into VDD, VDD and GND are not connected, and it is possible to maintain normal operation without being affected by noise.

As described above, according to the ESD protection circuit of the embodiment, a circuit configuration is formed, so that the two RC circuits 110, 120 with mutually different time constants are connected in parallel between VDD and GND, and the respective potentials (potentials at the node B and the node C) of the RC circuits 110, 120 are applied to the gate terminals of the NMOS transistors 310, 320 via the inverter circuits 210, 220. In addition, with the NMOS transistors 310, 320 being connected in series between VDD and GND, a circuit configuration is formed so that the ESD protection function operates only in the case where the two NMOS transistors 310, 320 are becomes ON at the same time.

As a result, in the case where the ESD noise is applied to VDD, with the two NMOS transistors 310, 320 becoming ON at the same time and a current flowing between the power source (VDD) and the ground (GND), the potential difference between VDD and GND decreases, that is, the function of ESD protection is the same as the function of the ESD protection circuit of the comparative example.

Meanwhile, in the case where noise is mixed with VDD to cause fluctuation during normal operation, since the RC circuit 120 with a larger time constant operates to not respond to such VDD fluctuation, the NMOS transistor 320 connected with the RC circuit 120 remains to be OFF.

That is, according to the ESD protection circuit of the embodiment, even if VDD fluctuates due to mixing of noise, issues such as that an unnecessary large current flows between the power source (VDD) and the ground (GND), the power consumption of the semiconductor integrated circuit increases or that a circuit element is damaged by the flow of the large current, etc., can be prevented.

Second Embodiment

Figure 5:
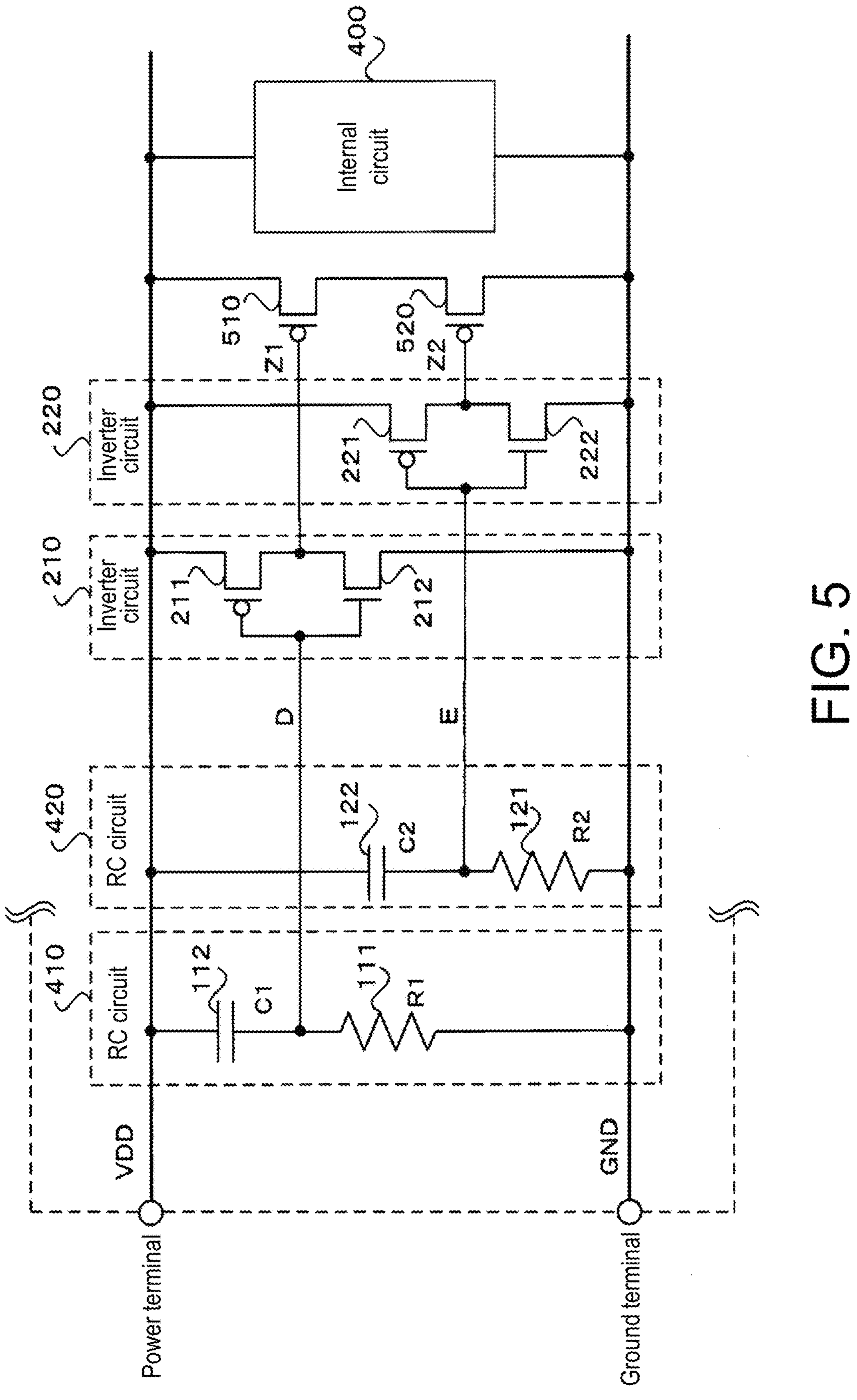
FIG. 5 is a diagram illustrating a circuit configuration of an ESD protection circuit according to a second embodiment of the disclosure.

Then, an ESD protection circuit of a second embodiment of the disclosure is described. FIG. 5 illustrates a circuit configuration of the ESD protection circuit according to the second embodiment of the disclosure. In FIG. 5, those with the same configuration shown in FIG. 3 are labeled with the same symbols, and the description thereof is omitted.

As shown in FIG. 5, the ESD protection circuit of the embodiment includes CR circuits 410, 420, inverter circuits 210, 220, and two PMOS transistors 510, 520.

In the CR circuit 410, the capacitance element 112 and the resistance element 111 are connected in series between VDD, which is a power wiring, and GND, which is a ground wiring.

In the CR circuit 420, the capacitance element 122 and the resistance element 121 are connected in series between VDD and GND. A time constant R2×C2 in the CR circuit 420 is set to be a value different from the time constant R1×C1 in the CR circuit 410. In the embodiment, the time constant R2×C2 in the CR circuit 420 is set to be a time constant larger than the time constant R1×C1 and a time constant in a magnitude that does not respond due to the noise mixed with GND. The time constant R1×C1 in the RC circuit 110 is set to be the same value as the time constant of the RC circuit 600 in the ESD protection circuit of the comparative example shown in FIG. 1 and the time constant of the RC circuit 110 in the ESD protection circuit of the first embodiment shown in FIG. 3.

The inverter circuit 210 forms a CMOS type inverter circuit in which a potential between the capacitance element 112 and the resistance element 111 forming the CR circuit 410 is input, and the PMOS transistor 211 and the NMOS transistor 212 are connected in series between VDD and GND.

In addition, the inverter circuit 220 forms a CMOS type inverter circuit in which a potential between the capacitance element 122 and the resistance element 121 forming the CR circuit 420 is input, and the PMOS transistor 221 and the NMOS transistor 222 are connected in series between VDD and GND.

The PMOS transistors 510, 520 are connected in series between VDD and GND. Specifically, in the PMOS transistor 310, the output of the inverter circuit 210 is input to the gate terminal, and the source terminal is connected to VDD. In addition, in the PMOS transistor 520, the output of the inverter circuit 220 is input to the gate terminal, the source terminal is connected with the drain terminal of the PMOS transistor 510, and the drain terminal is connected with GND.

In the ESD protection circuit of the embodiment as well, with the two PMOS transistors 510, 520 being connected in series between VDD and GND, it is configured that VDD and GND are connected only in the case where the two PMOS transistors 510, 520 become ON at the same time.

The ESD protection circuit of the embodiment forms a circuit configuration in which, with respect to the ESD protection circuit in the first embodiment shown in FIG. 3, the RC circuits 110, 210 are respectively replaced with the CR circuits 410, 420, and the NMOS transistors 310, 320 are respectively replaced with the PMOS transistors 510, 520.

In the ESD protection circuit of the embodiment, regarding the operation in the case where the ESD noise is applied to VDD, the operation is the same as the operation of the ESD protection circuit in the first embodiment shown in FIG. 3, except that the logic is reversed.

Also, in the ESD protection circuit of the embodiment, in the case in which some kind of noise is mixed into GND, since the time constant C1×R1 is small in the CR circuit 410, it is possible that the potential at the node D becomes equal to or more than the logic threshold of the inverter circuit 210 in response to the noise mixed into GND. However, since the time constant C2×R2 of the CR circuit 420 is set to be a large value, the potential at the node E can be prevented from reaching or exceeding the logic threshold of the inverter circuit 220.

Therefore, even in the case where the potential at a node Z1, which is the output of the inverter circuit 210, decreases due to the noise mixed into GND and the PMOS transistor 510 becomes ON, the potential of a node Z2, which is the output of the inverter 220, is maintained at H-level. Therefore, the PMOS transistor 520 remains OFF, and it is possible to prevent VDD and GND from being connected due to mixing of noise with GND.

Others

The NMOS transistors 310, 320 of the first embodiment and the PMOS transistors 510, 520 of the second embodiment operate to protect the internal circuit 400 from the ESD noise by setting the ESD noise as the ON current.

Here, the drain terminals of the NMOS transistors 310, 320 of the first embodiment and the source terminals of the PMOS transistors 510, 520 in the second embodiment may also be low-resistance films, such as salicide films, the low-resistance films having a conventional MOS structure. However, in order to increase ESD resistance, both of the drain terminals of the NMOS transistors 310, 320 may be formed by removing a salicide film. Likewise, both of the source terminals of the PMOS transistors 510, 520 may be formed by removing a salicide film.

According to the above, with the device with the configuration in which the salicide film is removed, a parasitic NPN transistor or a parasitic PNP transistor of an MOS transistor is operated, so that it is possible to increase the ESD protection function.

What is claimed is:

1. An ESD protection circuit, comprising:

a first RC circuit, connected in series between a power wiring and a ground wiring;

a first inverter circuit, to which a potential between a resistance element and a capacitance element forming the first RC circuit is input, and which is connected between the power wiring and the ground wiring;

a second RC circuit, which is connected in series between the power wiring and the ground wiring, and in which a time constant different from that of the first RC circuit is set;

a second inverter circuit, to which a potential between a resistance element and a capacitance element forming the second RC circuit is input, and which is connected between the power wiring and the ground wiring;

a first NMOS transistor, in which an output of the first inverter circuit is input to a gate terminal, and a drain terminal is connected with the power wiring; and a second NMOS transistor, in which an output of the second inverter circuit is input to a gate terminal, a drain terminal is connected with a source terminal of the first NMOS transistor, and a source terminal is connected with the ground wiring.

2. The ESD protection circuit as claimed in claim 1, wherein the second RC circuit is set with a time constant greater than that of the first RC circuit and having a magnitude so that no response occurs due to noise mixed into the power wiring.

3. The ESD protection circuit as claimed in claim 1, wherein the drain terminal of the first NMOS transistor and the drain terminal of the second NMOS transistor are both formed by removing a silicide film.

4. The ESD protection circuit as claimed in claim 1, wherein the second RC circuit is connected in parallel between the first RC circuit and the first inverter circuit.

5. The ESD protection circuit as claimed in claim 1, wherein the first inverter circuit is connected in parallel between the second RC circuit and the second inverter circuit.

6. The ESD protection circuit as claimed in claim 1, wherein the first inverter circuit comprises a first PMOS connected with the power wiring and a third NMOS connected with the ground wiring, and the second inverter circuit comprises a second PMOS connected with the power wiring and a fourth NMOS connected with the ground wiring.

7. An ESD protection circuit, comprising:

a first CR circuit, connected in series between a power wiring and a ground wiring;

a first inverter circuit, to which a potential between a capacitance element and a resistance element forming the first CR circuit is input, and which is connected between the power wiring and the ground wiring;

a second CR circuit, which is connected in series between the power wiring and the ground wiring, and in which a time constant different from that of the first CR circuit is set;

a second inverter circuit, to which a potential between a capacitance element and a resistance element forming the second CR circuit is input, and which is connected between the power wiring and the ground wiring;

a first PMOS transistor, in which an output of the first inverter circuit is input to a gate terminal, and a source terminal is connected with the power wiring; and a second PMOS transistor, in which an output of the second inverter circuit is input to a gate terminal, a source terminal is connected with a drain terminal of the first PMOS transistor, and a drain terminal is connected with the ground wiring.

8. The ESD protection circuit as claimed in claim 7, wherein the second CR circuit is set with a time constant greater than that of the first CR circuit and having a magnitude so that no response occurs due to noise mixed into the ground wiring.

9. The ESD protection circuit as claimed in claim 7, wherein the source terminal of the first PMOS transistor and the source terminal of the second PMOS transistor are both formed by removing a silicide film.

10. The ESD protection circuit as claimed in claim 7, wherein the second CR circuit is connected in parallel between the first CR circuit and the first inverter circuit.

11. The ESD protection circuit as claimed in claim 7, wherein the first inverter circuit is connected in parallel between the second CR circuit and the second inverter circuit.

12. The ESD protection circuit as claimed in claim 7, wherein the first inverter circuit comprises a third PMOS connected with the power wiring and a first NMOS connected with the ground wiring, and the second inverter circuit comprises a fourth PMOS connected with the power wiring and a second NMOS connected with the ground wiring.

* * * * *